Aug. 30, 1932.  C. S. MORSE  1,875,102
TIRE INSERT
Filed July 2, 1928
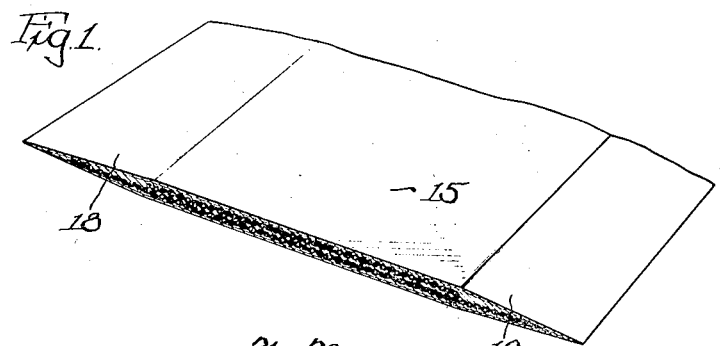
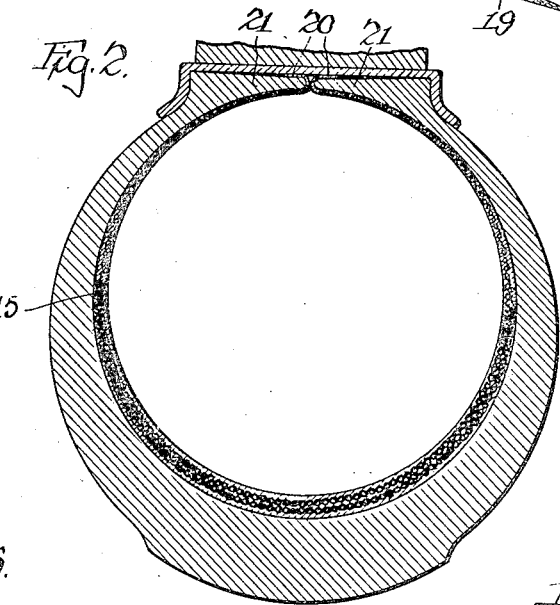
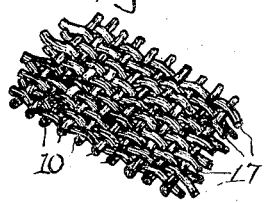
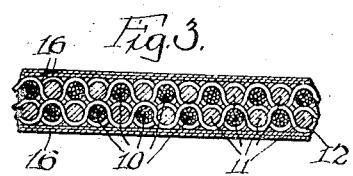
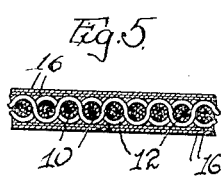
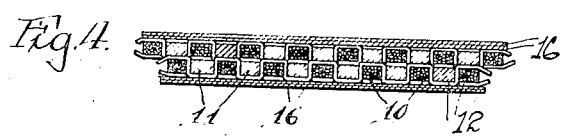

Patented Aug. 30, 1932

1,875,102

UNITED STATES PATENT OFFICE

CLYDE S. MORSE, OF DE KALB, ILLINOIS

TIRE INSERT

Application filed July 2, 1928. Serial No. 289,640.

My invention relates to certain improvements in automobile tire construction and more particularly to an improved form of insert adapted to be applied within or to the interior walls of tire casings to reinforce or strengthen the same and prevent puncturing of the inflated inner tubes.

My invention has specific reference to an improved insert of this type which may be readily provided as a pad and which may at any time be quickly inserted within and against the walls of a tire casing, these inserts being in a form permitting easy manufacture and of a construction efficiently protecting the inner tube against puncturing.

According to the teachings of the present invention, I contemplate providing the insert in the form of a substantially flat pad, which may be fitted against the interior walls of a tire casing, and which comprises a series of longitudinally arranged and alternately disposed resilient cables and fabric cord interwoven into a unit by cable or fabric warp, and imbedded between layers of fabric, or other desirable material, if so desired.

Other objects and advantages of my invention will be obvious from the detailed description and accompanying drawing which form a part hereof.

In the drawing:

Fig. 1 is a perspective view of an insert embodying my invention;

Fig. 2 is a vertical sectional view of a tire casing, having the insert fitted therein against the interior walls;

Fig. 3 is an enlarged fragmental sectional view of the resilient cables and fabric cord interwoven by the fabric warp;

Fig. 4 is a similar view illustrating the resilient cable rectangular in cross-section.

Fig. 5 is a form illustrating the use of a single row of resilient wire and fabric cord interwoven together in the pad.

Fig. 6 is a perspective view of a portion of an insert embodying a modified or alternative form of the invention.

It will be understood at the outset that while I shall describe my invention embodied in a pad adapted to be used as an insert against the interior walls of a tire casing, the construction may be embodied in the tire casing as an integral part, or it may be provided as an interior lining secured within the casing at any time in its construction or use.

The device shown comprises preferably a series of cables 10 arranged in rows and interwoven with cords 11, which are interspaced longitudinally between the cables and tied thereto by weft 12, which weft may be of suitable material such as a cord similar to cord 11, or cable similar to the cables 10. In the construction of pad 15, shown in Figs. 1 and 2, any number of rows of cable and cord constructed as above described may be secured together and then imbedded between layers of fabric 16. Before the rows of cable and cord are secured together, each row is preferably coated with rubber-like material. This coating tends to hold the cable and cord rigid in each row so as to prevent relative movement. A further advantage of the rubber coating resides in a vulcanizing action when the rows are secured together in the assembly. The rows are placed under pressure and then heated, which action tends to produce a vulcanizing of the rubber coating so as to securely hold the rows together.

Cable 10 is preferably of stranded formation. I find that it is very desirable to employ cable of small diameter so that the pad 15 may be relatively thin and flat in order to fit snugly against the interior walls of the tire casing and not interfere with the inflated inner tube. The pad or insert 15 very advantageously reinforces the casing and prevents blow-outs of a casing that has been worn considerably, or that is weak in spots. One form of adaptation is in connection with the tire casings or busses making cross-country trips and carrying a relatively large load. Any number of rows of cable and cord may be imbedded between the layers of fabric 16.

In Fig. 2, I have conveniently illustrated the use of one row extending the entire width of the pad, while a second row is arranged at the portion where the greatest wear on the tire occurs.

In Fig. 5, I have illustrated a single row of cable and cord in a pad which may be used where the wear and pressure on the tire is not as great.

It will be noted in Fig. 3 that where two rows are provided, the cable and cord of these rows are alternately arranged to bring the cable of one row against the cord of the next row, thereby keeping the cables of adjacent rows out of contact with each other.

As an alternative embodiment of my invention, I propose eliminating the cord 11 by arranging the cable 10 in closely spaced rows with similar cable 17 interwoven cross-wise to act as the weft in order to secure lateral reenforcing of the tire casing. I find that this form may be very advantageously employed where the portions of the tire casing adjacent the rim need reinforcement.

The pad or insert 15 may be of uniform thickness but as I have illustrated in Figs. 1 and 2, the sides 18 and 19 may be gradually tapered or made thinner.

Layers of fabric 16 are employed to obtain a relatively smooth outside surface for the pad. In this connection it will be noted that such layers of fabric may be omitted, if so desired, because under certain circumstances the cables 10 and weft 12 may be interwoven tight enough to secure a satisfactorily smooth surface.

Various provisions may be made for securing the ends 20 of pad 15 within the tire casing, but as illustrated in Figure 2, these ends may be turned upwardly and over the edges 21 of the casing. Such interlocking of the ends 20 of pad 15 will prevent sliding or shifting within the entire casing. I contemplate, however, employing an adhesive, if desirable, to secure pad 15 within tire casing in order to make it a permanent lining therein.

Cable 10 need not necessarily be of circular cross-section, inasmuch as cable of rectangular shape has been found to be very suitable, such as I have shown in Fig. 4.

It will be understood that the present invention contemplates different arrangements of the cables and weft and that the same advantageous results may be obtained whether the cables and weft are interwoven in unitary row relation, or otherwise, as long as they are incorporated in the tire casing to provide effective reinforcement. Each row is in itself complete to reinforce and protect the tire against punctures, although it may be assembled with others, as shown herein, where the load carried warrants greater strength or reinforcement of the tire casing. Arranging the cables in interwoven relation with the weft and in rows permits a construction which is flexible and very thin and which may be readily incorporated in the tire casing. Where more than one row is used, as shown in Figs. 3 and 4, the alternate spacing of the cables and cord prevents a nail or the like from passing through to the inner tube, as a protective blanket or barrier is formed preventing entrance therebeyond of anything sharp enough to pierce the outside of the casing. The same effect can be obtained of course by the net-like arrangement produced by weft made of cable, as shown in Fig. 6.

Those skilled in the art will appreciate that the structure shown and described may be incorporated in the tire casing at the time it is made, as well as a pad or insert for use between the casing and inner tube.

I claim:

1. Puncture proof material for use in a tire insert to make the same puncture-proof, comprising a plurality of superposed layers, each layer comprising a series of metallic cables, longitudinally interspersed cord members between said cables, and means to hold said cables and cord in place, said layers being arranged so that the cables of one layer cover the space between the cables of the adjacent layer whereby a substantially continuous metallic surface is formed which is substantially impervious to foreign particles.

2. Puncture proof material for use in a tire insert to make the same puncture-proof, comprising a plurality of superposed layers, each layer comprising a series of metallic cables, longitudinally interspersed cord members between said cables, and weft running crosswise to weave the cord and cables into a sheet, said layers being arranged so that the cables of one layer cover the space between the cables of the adjacent layer whereby a substantially continuous metallic surface is formed which is substantially impervious to foreign particles.

3. Puncture proof material for use in a tire insert to make the same puncture-proof, comprising a plurality of superposed layers, each layer comprising a series of metallic cables, longitudinally interspersed cord members between said cables, and means to hold said cables and cord in place, said layers being arranged so that the cables of one layer lie adjacent the cords of the adjacent layer whereby a substantially continuous metallic surface is formed which is substantially impervious to foreign particles.

4. Puncture proof material for use in a tire insert to make the same puncture-proof, comprising a plurality of superposed layers, each layer comprising a series of resilient metallic cables, longitudinally interspersed cord members between said cables, and means to hold said cables and cord in place, said layers being arranged so that the cables of one layer cover the space between the cables of the adjacent layer whereby a substantially continuous metallic surface is formed which is substantially impervious to foreign particles.

In witness whereof, I have hereunto subscribed my name.

CLYDE S. MORSE.